United States Patent
Rapp et al.

(10) Patent No.: US 6,195,318 B1
(45) Date of Patent: Feb. 27, 2001

(54) METHOD FOR THE CORRECTION OF A TRACKING ERROR SIGNAL DURING OPTICAL SCANNING OF A RECORDING MEDIUM IN THE FORM OF A DISC

(75) Inventors: Stefan Rapp, St. Georgen; Heinz-Jörg Schroeder; Friedhelm Zucker, both of Villingen-Schwenningen, all of (DE)

(73) Assignee: Deutsche Thomson-Brandt GmbH, Villingen-Schwenningen (DE)

( * ) Notice: Subject to any disclaimer, the term of this patent is extended or adjusted under 35 U.S.C. 154(b) by 0 days.

(21) Appl. No.: 09/207,358

(22) Filed: Dec. 8, 1998

(30) Foreign Application Priority Data

Dec. 18, 1997 (DE) .............................. 197 56 457

(51) Int. Cl.$^7$ ...................................... G11B 7/00
(52) U.S. Cl. .................... 369/44.32; 369/44.35; 369/110
(58) Field of Search ............. 369/44.26, 44.29, 369/44.31, 44.32, 44.33, 44.35, 44.36, 44.37, 54, 110, 112

(56) References Cited

U.S. PATENT DOCUMENTS

| | | | |
|---|---|---|---|
| 5,523,994 | 6/1996 | Ando et al. | 369/112 |
| 5,561,655 | * 10/1996 | Gage et al. | 369/44.23 X |

FOREIGN PATENT DOCUMENTS

| | | | |
|---|---|---|---|
| 3923329 A1 | 1/1991 | (DE) . | |
| 4026875 A1 | 2/1992 | (DE) . | |
| 4218642 A1 | 12/1992 | (DE) . | |
| 295 572 A3 | 12/1988 | (EP) . | |
| 410 639 A2 A3 | 1/1991 | (EP) . | |

OTHER PUBLICATIONS

German Search Report.

* cited by examiner

*Primary Examiner*—Paul W. Huber
(74) *Attorney, Agent, or Firm*—Joseph S. Tripoli; Paul P. Kiel

(57) ABSTRACT

Method for the correction of a tracking error signal during optical scanning of a recording medium in the form of a disc.

In the case of MO discs, the Kerr rotation angle is in general very small, so that so-called enhancement is used for processing. This leads to birefringence effects which are thermally induced on the WO disc during the writing process producing a noise level on the track error signal.

According to the invention, an optical scanner arrangement is used to determine light intensities from two mutually perpendicular polarization planes. A noise element, which is produced by interfering polarization rotation of the light, in the tracking error signal is compensated by linking the electrical output signals of the scanner arrangement.

Applicable both to MO and WO as well as CD audio, CD video and CD-ROM.

4 Claims, 1 Drawing Sheet

METHOD FOR THE CORRECTION OF A TRACKING ERROR SIGNAL DURING OPTICAL SCANNING OF A RECORDING MEDIUM IN THE FORM OF A DISC

FIELD OF THE INVENTION

The invention relates to a method for the correction of a tracking error signal during optical scanning of a recording medium in the form of a disc.

BACKGROUND OF THE INVENTION

In addition to read-only recording media in the form of discs, recording media are also known which can be written to once or a plurality of times. It is desirable to use a single, universal optical scanner both for reading such media and for writing to such media as can be written to, such as Write Once discs, which are called WO discs, as well as magneto-optical discs, which are called MO discs. Since, in general, the Kerr rotation angle of an MO disc is very small, so-called enhancement is used for processing, with the consequence that the detectors for the tracking error signal also receive polarized light. This leads to birefringence effects which are thermally induced on the WO disc during the writing process producing a noise level on the tracking error signal.

In general, this would have no disturbing effect. According to one industry standard relating to recording media, the tracking error signal is, however, modulated with a small additional oscillation which represents a signal which is called the ATIP signal, or Absolute Time In Pregroove signal. This ATIP signal, which is intended to be used to derive the position of the scanner and the disc speed, is interfered with by the noise level. The noise level makes it impossible to determine the position of the optical scanner during the writing process. The interference can even become so great that it is no longer possible to control the speed of the disc. However, both information items are very important for making it possible to use normal CD players to replay discs recorded in such a way. In addition, the industry standard, which is described in the Orange Book, specifies position monitoring.

One already known solution provides for use of special WO-optical scanners, which operate with circular polarized light. However, an additional scanner is then required for MO. It is also possible to use MO scanners which manage without enhancement. However, it is very difficult to adjust such scanners, so that their use is not feasible for a mass market.

SUMMARY OF THE INVENTION

The invention is based on the object of specifying a method for the correction of a tracking error signal during optical scanning of a recording medium in the form of a disc, in order to allow evaluation of the tracking error signal despite a superimposed noise element.

In the case of a method according to the precharacterizing clause of claim 1, this object is achieved by the features specified in the characterizing part.

The invention is based on the following knowledge and idea: Birefringence effects do not normally change the intensity of the reflected light, but only the polarization plane. Using a vectorial representation of the polarization components and light intensities, it was found that the noise element can be ascribed to just one polarization component. By rewriting the formulae which describe the vectorial polarization components and the light intensities, it was possible to calculate the noise element in order to obtain, as the result, exclusively the value of the desired ATIP signal. Thus, the noise which is caused by a polarization shift is compensated for, for a continuously processing solution, by linking the electrical output signals of the scanner arrangement.

According to a development, both amplitude levels of the electrical output signals are evolved during the process of linking the electrical output signals of the scanner arrangement. Both the sum and the difference are then formed from both evolved output signals, after which the results of the sum and difference formation are each squared and, finally, the results of the squaring are added with different weighting. These measures correspond to the computation steps in order to recover the original ATIP signal again from the ATIP signal which is subject to the noise component.

The weighting expediently corresponds to the factor which was used to attenuate that polarization component having the greater magnitude, for the purpose of reinforcing the Kerr effect relative to the polarization component having the smaller magnitude. Mathematically exact compensation for the noise element is then possible.

In the case of a practical implementation of the invention, the magnitudes of the intensities are first normalized, and linearized evolution and squaring functions are then carried out using the normalized values. In this way, it is possible to simplify the computation operations, in order to reduce the computation effort for the data rate to be processed.

BRIEF DESCRIPTION OF THE DRAWINGS

The invention will be explained in the following text using an exemplary embodiment and with reference to drawings, in which.

DESCRIPTION OF THE PREFERRED EMBODIMENTS

Figure 1:
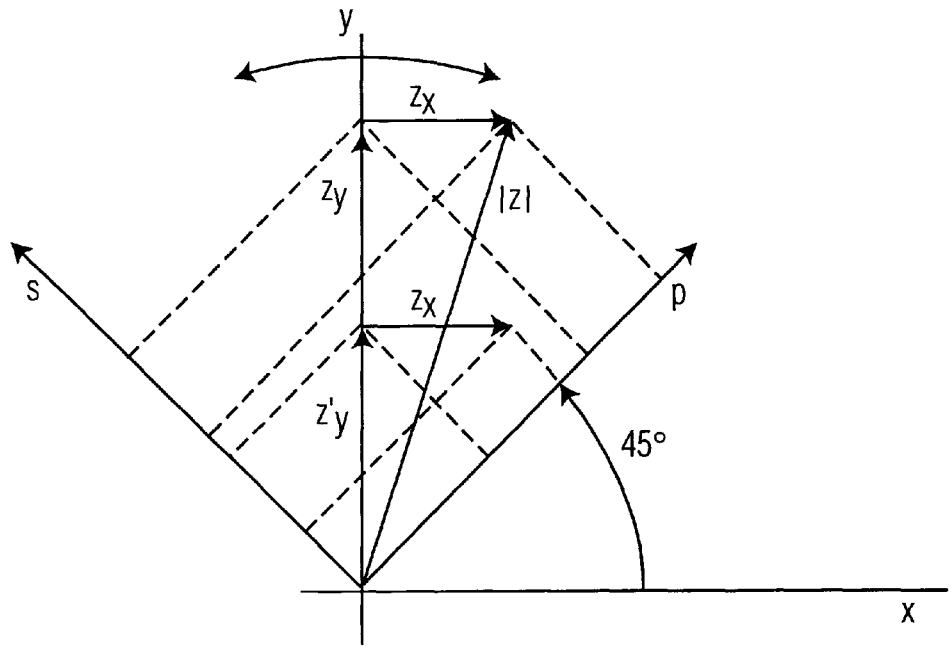
FIG. 1 shows a vector diagram of the components of the electrical fields of the light reflected from an optical disc.

FIG. 1 shows a vector diagram of the components of the electrical fields of the light reflected from an optical disc.

In the case of the unpolarized verification, the amplitude of the ATIP signal must be proportional to $|z|^2$. In the case of the normally used verification with enhancement, one polarization component is attenuated in order to produce an apparently greater Kerr rotation angle. This enhancement is based on the large polarization component being attenuated to about ⅕, while the small polarization component, which contains the MO signal, is passed through 100%.

In this case it is assumed that the signal verification is carried out in the reflected path. Other options are, of course, optically feasible. In the case of such a verification, the intensities of the detectors are as follows:

$$I_p = (\tfrac{1}{2}\sqrt{2}(\sqrt{R_{yz_y}} + z_x))^2 \tag{1}$$

$$I_s = (\tfrac{1}{2}\sqrt{2}(\sqrt{R_{yz_y}} - z_x))^2 \tag{2}$$

If the ATIP signal is obtained by addition from the signals from these detectors, the amplitude is proportional to $$<ATIP> = z_x^2 + R_y * z_y^2 = |z|^2 \tag{3}.$$

This means that polarization plane shifts caused by thermal birefringence produce very major changes in the amplitude, and thus cause a major noise component $R_y$.

By linking and mathematical rewriting of the two components, it is possible to eliminate the noise component. The first stage of doing this is electronically to take the square root of the signals which are obtained from the two polarization components according to Equations (1) and (2). The results are shown in Equations (4) and (5):

$$E_p = \tfrac{1}{2}\sqrt{2}(\sqrt{R_{yz_y}} + z_x) \quad (4)$$

$$E_s = \tfrac{1}{2}\sqrt{2}(\sqrt{R_{yz_y}} - z_x) \quad (5)$$

The values obtained according to Equations (4) and (5) are both added and subtracted. This now gives the following equations:

$$E_p + E_s = \sqrt{2}(\sqrt{R_y z_y}) \quad (6)$$

and $$E_p - E_s = \sqrt{2} z_x) \quad (7)$$

If the sum and difference values obtained in this way are squared and are then added to one another in weighted form, then this gives:

$$<ATIP> = \tfrac{1}{2}[1/R_y(E_p+E_s)^2 + (E_p - E_s)^2] = z_x^2 + z_y^2 \quad (8)$$

and thus an ATIP amplitude which is once again proportional to the intensity and is thus independent of polarization.

Figure 2:
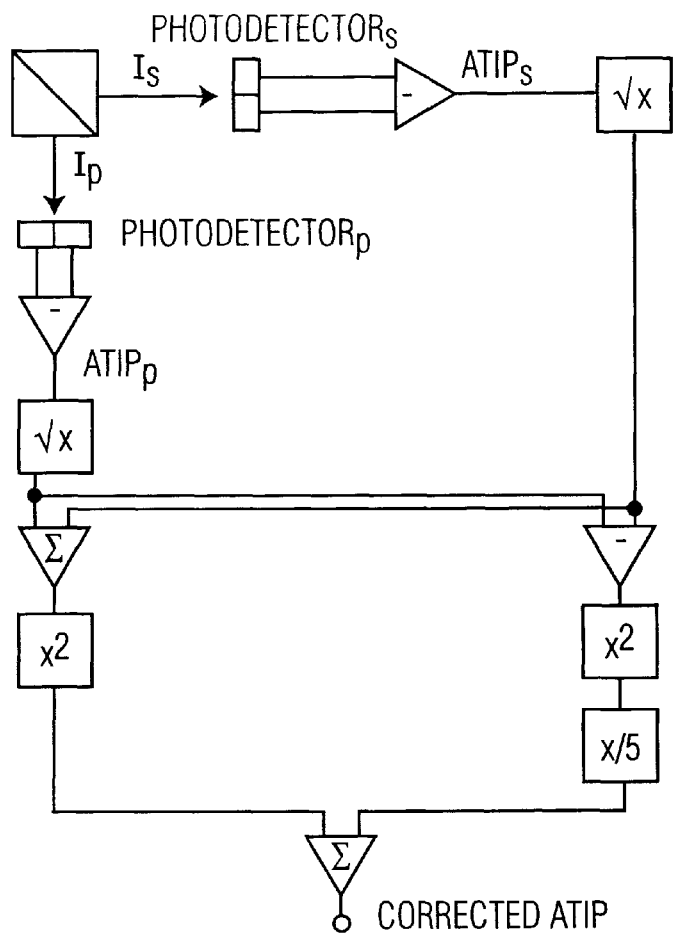
FIG. 2 shows a block diagram for carrying out the method.

FIG. 2 shows a block diagram for carrying out the method. The mutually perpendicular polarization components $I_s$ and $I_p$ of the light reflected from the optical disc are respectively passed to a photodetector$_s$ and a photodetector$_p$. The photodetectors convert the light into electrical signals, which represent components ATIP$_s$ and ATIP$_p$ of the tracking error signal. In the following evolution operations $\sqrt{X}$, the square root of the values of the components ATIP$_s$ and ATIP$_p$ is formed electronically. The results at the outputs of the evolution operation are now, with the two components being linked, both added in an adder $\Sigma$ and, in parallel with this, are subtracted in a subtractor −. The output signals of the adder $\Sigma$ and results of the subtractor − are then respectively squared in squaring operations $X^2$. Finally, the components, which have been processed in parallel until this point, are added in a further adder $\Sigma$ after, however, the squared signal originating from the subtractor − has been weighted by a factor x/5. The corrected tracking error signal ATIP is then present at the output of the last adder.

What is claimed is:

1. Method for the correction of a tracking error signal during optical scanning of a recording medium in the form of a disc, wherein an optical scanner arrangement is used to determine light intensities from two mutually perpendicular polarization planes, and a noise element, which is produced by interfering polarization rotation of the light, in the tracking error signal is compensated by linking the electrical output signals of the scanner arrangement.

2. Method according to claim 1, wherein both amplitude levels of the electrical output signals according to said light intensities are evolved during the process of linking the electrical output signals of the scanner arrangement, both the sum and the difference are then formed from both evolved output signals, after which the results of the sum and difference formation are in each case squared, and, finally, the results of the squaring are added with different weighting.

3. Method according to claim 1, wherein both amplitude levels of the electrical output signals according to said light intensities are evolved during the process of linking the electrical output signals of the scanner arrangement, both the sum and the difference are then formed from both evolved output signals, after which the results of the sum and difference formation are in each case squared, and, finally, the results of the squaring are added with different weighting and the weighting corresponds to the factor which was used to attenuate that polarization component having the greater magnitude, for the purpose of reinforcing the Kerr effect relative to the polarization component having the smaller magnitude.

4. Method according to claim 1, wherein the magnitudes of the intensities are first normalized, and linearized evolution and squaring functions are carried out with the normalized values.

* * * * *